United States Patent [19]
Ukai et al.

[11] Patent Number: 5,068,748
[45] Date of Patent: Nov. 26, 1991

[54] ACTIVE MATRIX LIQUID CRYSTAL DISPLAY DEVICE HAVING IMPROVED ELECTROSTATIC DISCHARGE PROTECTION

[75] Inventors: Yasuhiro Ukai, Kobe; Tomihisa Sunata, Miki; Teizou Yukawa; Toshiya Inada, both of Kobe, all of Japan

[73] Assignee: Hosiden Corporation, Osaka, Japan

[21] Appl. No.: 598,199

[22] Filed: Oct. 16, 1990

[30] Foreign Application Priority Data

Oct. 20, 1989 [JP] Japan .................. 1-273420

[51] Int. Cl.⁵ .............................................. G02F 1/133
[52] U.S. Cl. ....................................... 359/59; 350/334; 359/87; 357/23.7; 357/23.13
[58] Field of Search ........... 350/333, 334, 336, 331 R, 350/339 R; 340/719, 784; 357/23.7, 23.8, 45, 51, 23.13; 361/91, 58

[56] References Cited

U.S. PATENT DOCUMENTS 4,738,749  4/1988  Maurice et al. ................. 350/336
4,803,536  2/1989  Tuan ................................ 357/23.7
4,876,584  10/1989  Taylor ............................ 357/23.13

FOREIGN PATENT DOCUMENTS 0092929  4/1988  Japan .................................. 350/334
0180935  7/1988  Japan .................................. 340/784
0208023  8/1988  Japan .................................. 340/784
0032234  2/1989  Japan .................................. 340/784
0302228  12/1989  Japan ................................. 340/784

Primary Examiner—Stanley D. Miller
Assistant Examiner—Tai V. Duong
Attorney, Agent, or Firm—Pollock, Vande Sande and Priddy

[57] ABSTRACT

In an active matrix liquid crystal display device an internal short circuiting bus is formed across source and gate buses outside of a display region where thin film transistors and pixel electrodes are respectively arranged in a matrix form and inside of arrays of source and gate bus terminals. At intersections of the internal short circuiting bus with the source bus and the gate bus coupling elements of a high resistance material are provided for connecting the internal short circuiting bus to the source bus and the gate bus, respectively.

7 Claims, 9 Drawing Sheets

ACTIVE MATRIX LIQUID CRYSTAL DISPLAY DEVICE HAVING IMPROVED ELECTROSTATIC DISCHARGE PROTECTION

BACKGROUND OF THE INVENTION

The present invention relates to an active matrix liquid crystal display device and, more particularly, to an active matrix liquid crystal display device having improved electrostatic protection.

Figure 1:
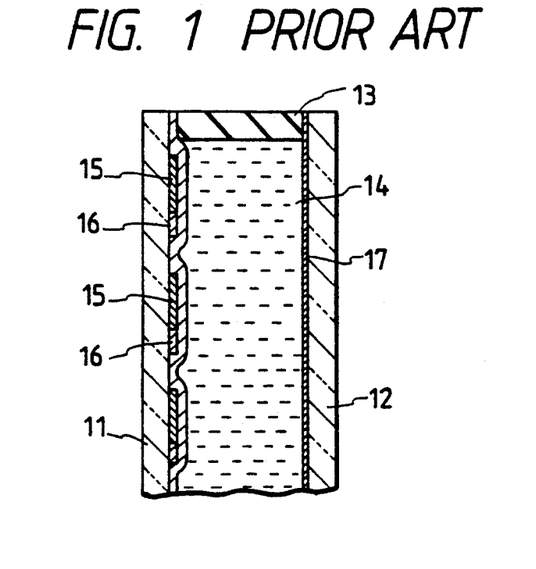
FIG. 1 is a sectional view part of a part of a conventional liquid crystal display device.

FIG. 1 shows a conventional active matrix liquid crystal display device in which liquid crystal 14 is hermetically sealed in the space defined by a pair of opposed transparent base plates 11 and 12 as of glass with a spacer 13 interposed therebetween along their marginal edges. The one transparent base plate 11 has on its inside a plurality of pixel electrodes 15 each adjoined by a thin film transistor (hereinafter referred to as TFT) 16 serving as a switching element. The TFT 16 has its drain connected to the pixel electrode 15 corresponding thereto. The other transparent base plate 12 has on its inside a transparent common electrode 17 opposite the pixel electrodes 15 across the liquid crystal 14.

Figure 2:
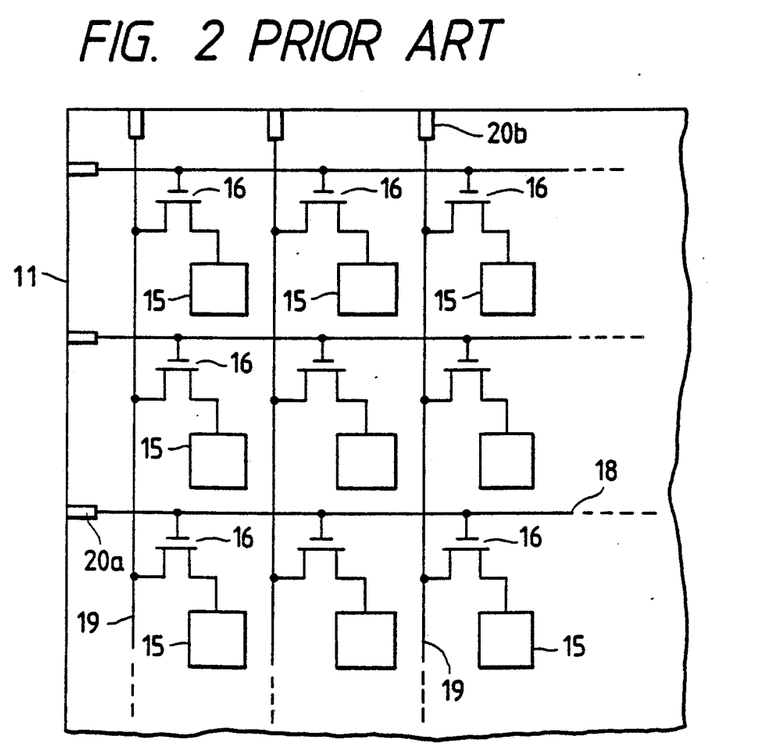
FIG. 2 is an equivalent circuit diagram of the conventional liquid crystal display device.

As shown in FIG. 2, the transparent base plate 11 has the pixel electrodes 15 square in shape and closely arranged in a matrix form, gate buses 18 formed as scanning buses in close proximity to the electrode arrays in the row-direction and extending along them and source buses 19 formed as signal buses in close proximity to the electrode arrays in the column direction and extending along them. At the intersections of the gate and source buses 18 and 19 there are disposed the TFTs 16, which have their gates and sources connected to the gate and source buses 18 and 19 at their intersections and have their drains connected to the pixel electrodes 15.

When applying voltage across a pair of selected ones of the gate and source buses 18 and 19, only the associated TFT 16 is turned ON to store therethrough charges in the pixel electrode 16 connected to its drain, applying voltage across only that portion of the liquid crystal 14 sandwiched between the activated pixel electrode 15 and the common electrode 17. This renders the above-said portion of the liquid crystal 14 transparent or nontransparent to light, thus providing a selective display. The display can be erased simply by discharging the charges stored in the pixel electrode 15. Connected to the gate and source buses 18 and 19 at one or both ends thereof and provided at marginal edges of the transparent base plate 11 are terminals 20a and 20b for external connection.

Figure 3:
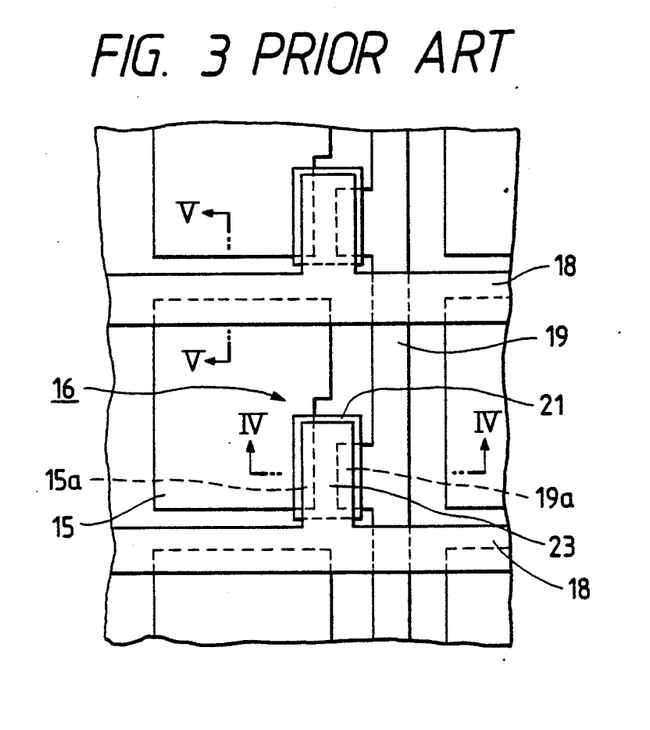
FIG. 3 is a plan view showing a pixel and its vicinity in the conventional liquid crystal display device.
Figure 4:
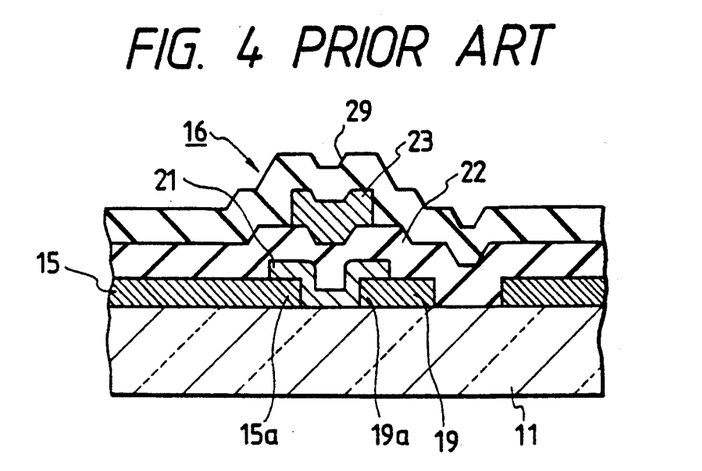
FIG. 4 is a sectional view taken on the line IV—IV in FIG. 3.

The TFT's 16 have such a construction as shown in FIGS. 3 and 4. On the transparent base plate 11 the pixel electrode 15 and the source bus 19 are each formed by a transparent conductive film as of ITO and a semiconductor layer 21 as of amorphous silicon is deposited which bridges the gap between the pixel electrode 15 and the source bus 19 along their parallel-opposed marginal edges. The semiconductor layer 21 is covered with a gate insulating film 22 as of silicon nitride. On the gate insulating film 22 a gate electrode 23 is formed which extends between and partly overlaps the pixel electrode 15 and the source bus 19. The gate electrode 23 is connected at one end to the gate bus 18. Thus, those portions of the pixel electrode 15 and the source bus 19 which are opposite to the gate electrode 23 form a drain electrode 15a and a source electrode 19a, respectively. The electrodes 15a and 19a, the semiconductor layer 21, the gate insulating film 22 and the gate electrode 23 constitute the TFT 16. The gate electrode 23 and the gate bus 18 are simultaneously formed of aluminum (Al), for example. A protective layer 29 for protection of the liquid crystal 14 is deposited all over the gate electrode 23.

Figure 5:
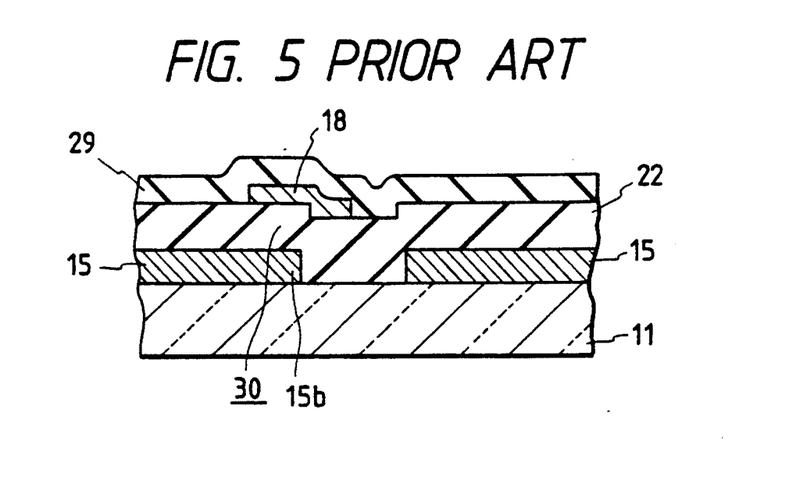
FIG. 5 is a sectional view taken on the line V—V in FIG. 3.

As depicted in FIG. 5 which is a sectional view taken on the line V—V in FIG. 3, one end portion of the pixel electrode 15 underlying the neighboring gate bus 18 extends to substantially the center of the bus 18 widthwise thereof to form an additional capacitance region 30 in the gate insulating film 22 between the extending end portion of the pixel electrode 15 and the gate bus 18. The additional capacitance region 30 is needed to supplement the electrostatic capacitance of the pixel electrode 15 to provide a large time constant composed of the electrostatic capacitance of the pixel electrode 15 and the resistance value of a channel region of the TFT 16.

Figure 6:
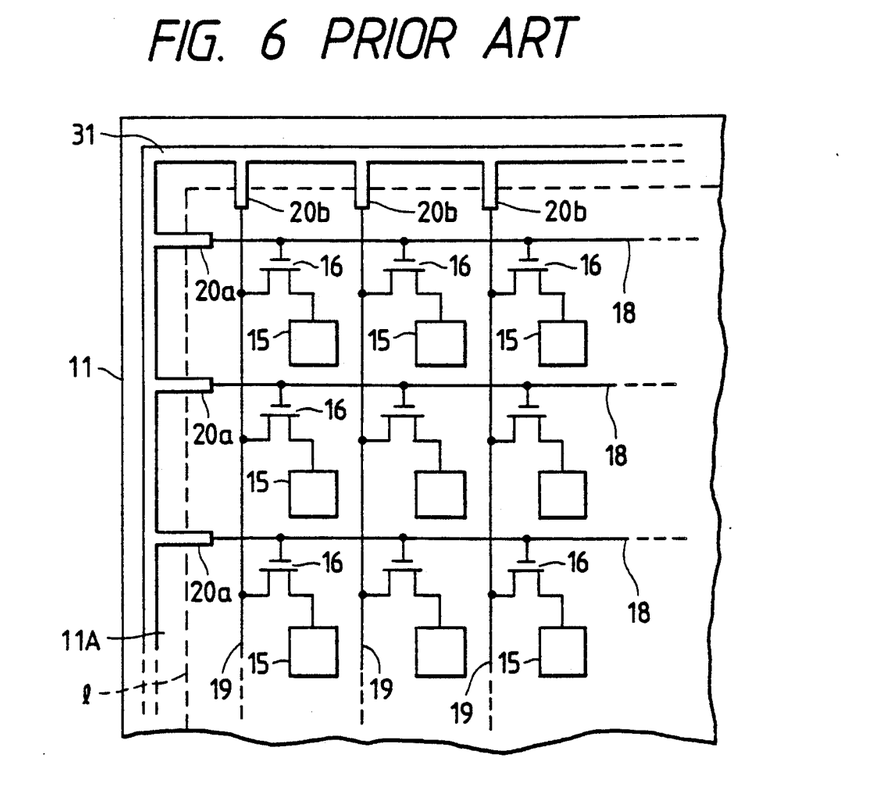
FIG. 6 is an equivalent circuit diagram of a conventional liquid crystal display device having a static electricity preventive structure.

In the course of manufacturing a liquid crystal display device static electricity occasionally develops, flows into a particular gate or source bus and breaks down or deteriorates many of TFT's connected thereto, resulting in what is called a line defect. A conventional solution to this problem is shown in FIG. 6, according to which during the manufacture of the display device the gate and source buses 18 and 19 are all shorted by an external short circuiting bus 31 to widely distribute the static electricity to all the buses, thereby lessening its influence. Near the end of manufacture the transparent base plate 11 is cut along the broken line 1 to remove the external short circuiting bus 31.

Figure 7:
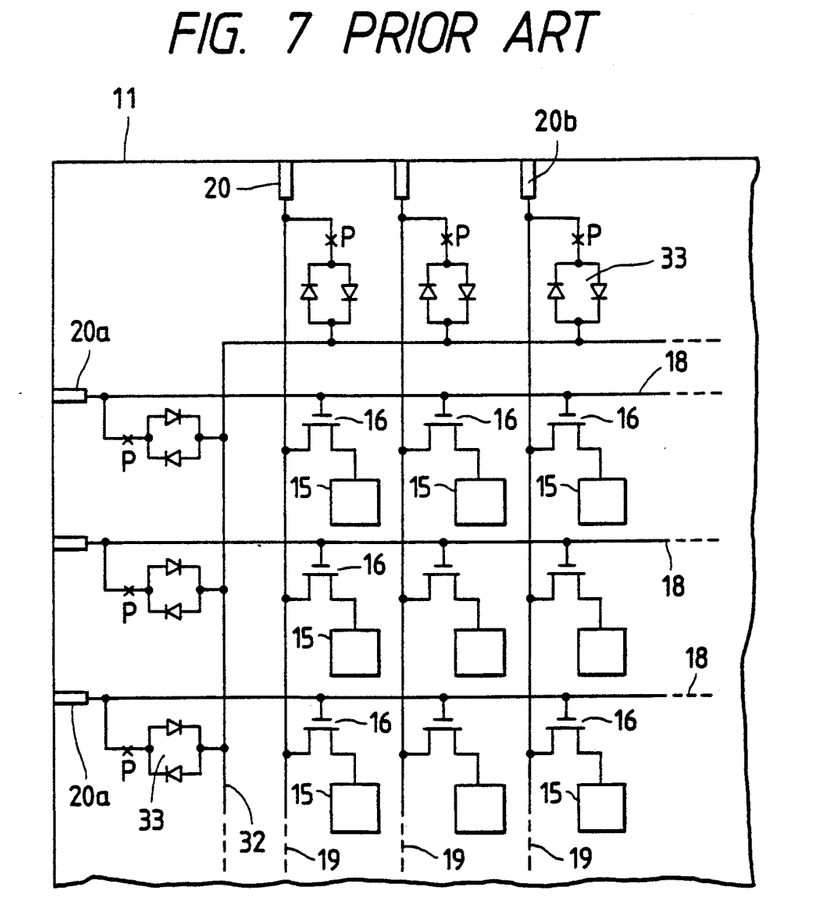
FIG. 7 is an equivalent circuit diagram of a conventional liquid crystal display device employing another static electricity preventive structure.

Another solution proposed so far is depicted in FIG. 7, in which an internal short circuiting bus 32 is provided and a diode circuit 33 formed by an anti-parallel connection of a pair of diodes is provided between the internal short circuiting bus 32 and one end of each of the gate and source buses 18 and 19 so that all the buses are short-circuited with respect to static electricity of a relatively high voltage in excess of threshold voltages of the diodes to thereby produce the same effect as mentioned above.

Near the end of the manufacture wires leading to the diode circuits 33 are each cut by etching as indicated by P.

With the conventional method employing the external short circuiting bus 31 shown in FIG. 6, the peripheral portion of the base plate where the short circuiting bus 31 is present is removed by means of a diamond cutter shortly before the end of the manufacturing process, but such mechanical cutting may sometimes generate static electricity which will make the display element defective.

With the method utilizing the internal short circuiting bus 32 and the diode circuits 33 as shown in FIG. 7, the wires leading to the diode circuits 33 must be cut at the point P by etching in a manner to prevent the generation of static electricity—this calls for an appreciable number of fabrication steps.

In either case, the finished display element is completely open to static electricity. Accordingly, there has been a strong demand for static electricity control measures which would be effective in the assembling of, for example, a liquid crystal television set using the finished display device as well as in the inspection of the finished display device.

SUMMARY OF THE INVENTION

It is therefore an object of the present invention to provide static electricity control measures which are effective not only in the manufacturing process of the display device but also in the assembling process of an apparatus employing the display device.

The present invention is directed to an active matrix liquid crystal display element of the type in which a transparent base plate has on its inside: pluralities of equally-spaced-apart source and gate buses formed at right angles to each other; thin film transistors each connected to the source and gate buses at their intersection and formed at a corner in a pixel region defined by the source and gate buses; pixel electrodes each connected with one of the thin film transistors and formed widely in the pixel region; and source and gate bus terminals respectively connected to the source and gate buses at least one end thereof and formed along marginal edges of the transparent base plate.

According to an aspect of the present invention, there are further formed on the transparent base plate an internal short circuiting bus which extends across the source and gate buses outside a display region including the thin film transistors and the pixel electrodes arranged in a matrix form but inside arrays of the source and gate bus terminals, and coupling elements each formed of a high resistance material near one of the intersections of the internal short circuiting bus with the source and gate buses for electrically interconnecting them.

According to another aspect of the present invention, an external short circuiting bus is formed along the arrays of the source and gate bus terminals on the outside thereof and these bus terminals are connected to the external short circuiting bus.

DESCRIPTION OF THE PREFERRED EMBODIMENT

Figure 8:
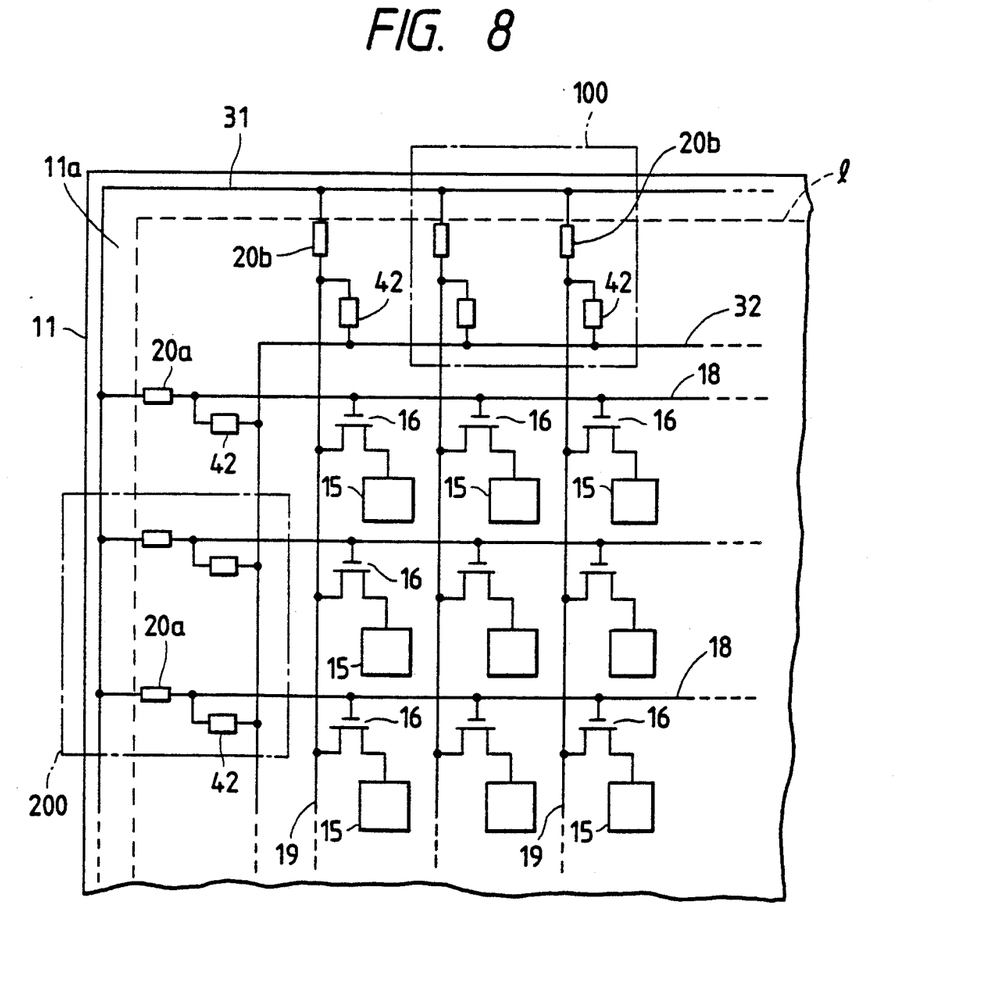
FIG. 8 is an equivalent circuit diagram showing an embodiment of the present invention.

Referring now to FIG. 8, an embodiment of the present invention will be described. The parts corresponding to those in FIGS. 2, 6 and 7 are identified by the same reference numerals. According to the present invention, the internal short circuiting bus 32 is formed extending across the source and gate buses 18 and 19 around the image display area where the TFT's 16 and the pixel electrodes 15 are arranged in a matrix form. At each intersecting point where the internal short circuiting bus 32 crosses the source and gate buses 18 and 19 a coupling element 42 of a high resistance material (a semiconductor, for example) is provided for electrically connecting them. In the embodiment shown in FIG. 8, the marginal portion of the transparent base plate 11 is extended outwardly of the gate and source bus terminals 20a and 20b as indicated by 11a and the external short circuiting bus 31 is formed on the extended marginal portion 11a for short circuiting the gate bus terminals 20a and the source bus terminals 20b, respectively. As in the prior art, the extended marginal portion 11a is cut off along the line 1 shortly before the end of the display element manufacturing process.

The coupling element 42 may be a nonlinear element (a diode, for instance) whose terminal voltage presents a high resistance value, for example, above 1 MΩ for a low voltage, say, 30 V or below and a low resistance value below several kilo ohms for a high voltage, for instance, above 70 to 80 V, that is, a high voltage developed by static electricity and, in particular, detrimental to the TFT's. Alternatively, the coupling element 42 may be a linear element (a resistance element, for example) which presents a virtually constant resistance value (tens of kΩ to hundreds of kΩ, for instance) for the terminal voltage.

With the external short circuiting bus 31, static electricity which is developed in the manufacturing process is distributed to all the gate and source buses 18 and 19 to thereby prevent the generation of a line defect or the like until the marginal portion 11a of the transparent base plate 11 is cut off, as referred to previously in respect of the prior art. The internal short circuiting bus 32 and the coupling elements 42 similarly serve to preclude the influence of static electricity which is developed during cutting of the marginal portion 11a and by every cause thereafter. Incidentally, the external short circuiting bus 31 may sometimes be omitted.

Figure 9A:
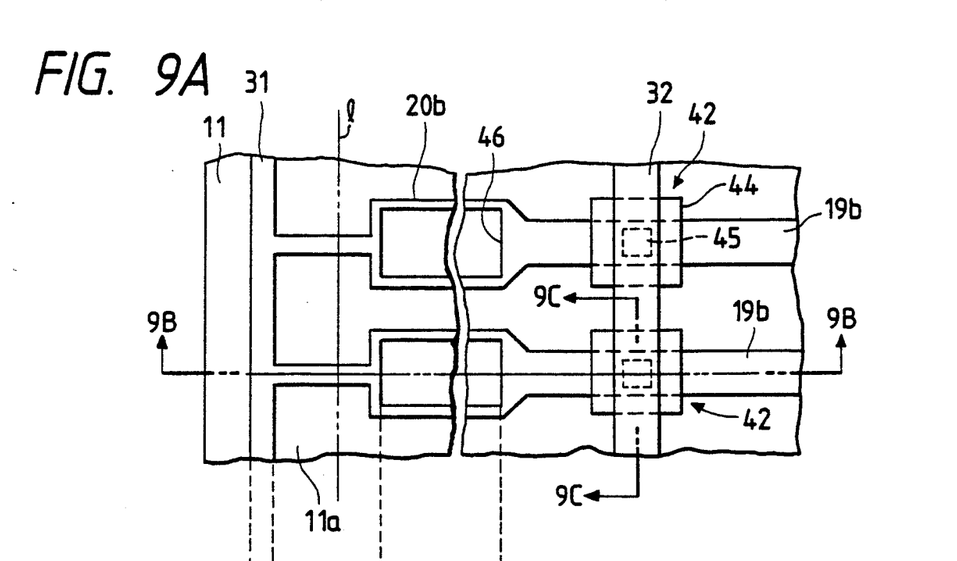
FIG. 9A is an enlarged plan view showing a first example of the structure of a first region 100 in FIG. 8.
Figure 9B:
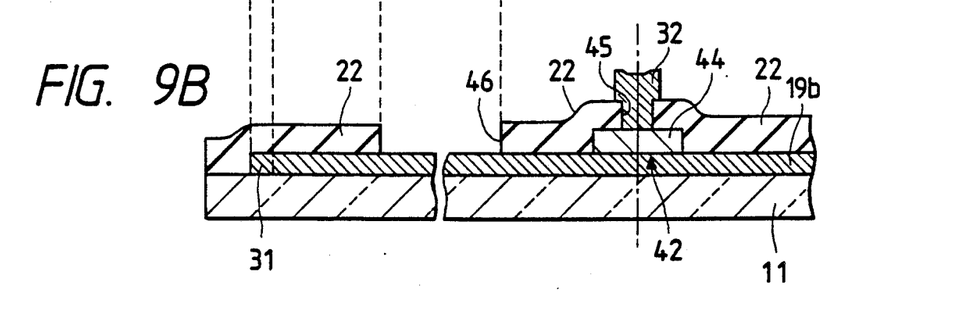
FIG. 9B is a sectional view taken on the line 9B—9B in FIG. 9A.
Figure 9C:
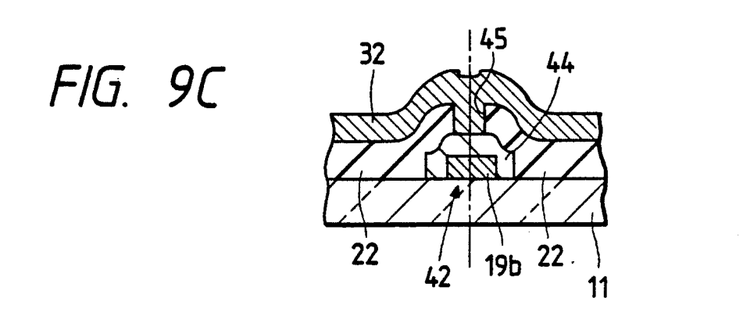
FIG. 9C is a sectional view taken on the line 9C—9C in FIG. 9A.
Figure 10A:
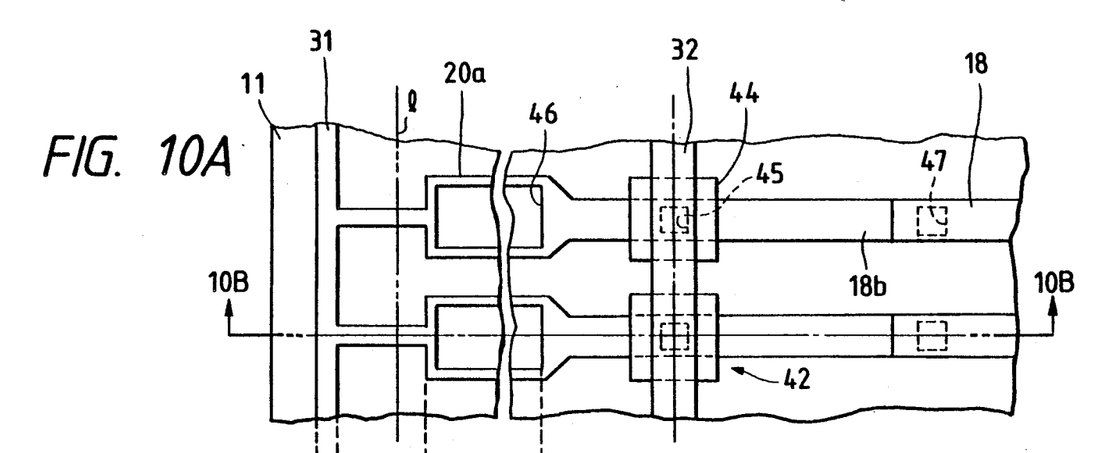
FIG. 10A is an enlarged plan view of a second region 200 in FIG. 8.
Figure 10B:
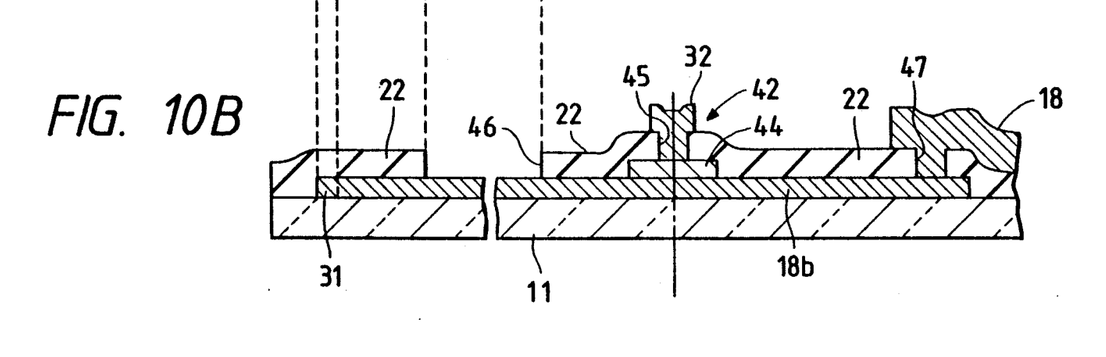
FIG. 10B is a sectional view taken on the line 10B—10B in FIG. 10A.

Next, a description will be given, with respect to FIGS. 9A, 9B, 9C, 10A and 10B, of concrete structures of the internal and external short circuiting buses 32 and 31 and the coupling elements 42 on the transparent base plate 11. In FIGS. 9 and 10 there are also shown the parts which are formed of the same materials as of the TFT's 16 and simultaneously therewith, and no detailed description will be repeated in connection with them.

FIG. 9A is an enlarged plan view of a first region 100 in FIG. 8, showing a first example of its structure. FIGS. 9B and 9C are sectional view taken on the lines 9B—9B and 9C—9C in FIG. 9A, respectively. The marginal portion 11a of the transparent base plate 11 is extended outside of the source bus terminals 20b. The external short circuiting bus 31 for short circuiting the terminals 20b is formed along the marginal edge of the extended marginal portion 11a at the same time as the source buses 19 and their extensions 19b are formed. A semiconductor layer 44 of a high resistance layer forming the coupling element 42 is deposited in a square form striding across the source bus extension 19b (the portion of the source bus 19 extended from the pixel arrangement region to the terminal 20b) widthwise thereof at the same time as the semiconductor layer 21 of the TFT 16 in FIG. 4 is deposited. The gate insulating film 22 is formed on the semiconductor layers 44, the external short circuiting bus 31, the source bus extensions 19b and the pixel electrodes (not shown) all over the transparent base plate 11. Those portions of the gate insulating film 22 overlying the central portions of each semiconductor layer 44 and each terminal 20b are etched away to form a hole 45 for connection to the semiconductor layer 44 and a hole 46 through which the source terminal 20b is exposed. Simultaneously with the formation of the gate electrode 23 and the gate bus 18 (see FIGS. 3 and 5 as well) the internal short circuiting bus 32 of aluminum or like metallic material is formed filling in the hole 45, covering the neighboring wall surface of the gate insulating film 22 and extending across the source bus extension 19b at right angles thereto. The internal short circuiting bus 32 is electrically connected to the source bus extension 19b through the semiconductor layer 44. The semiconductor layer 44, the internal short circuiting bus 32 and the portion of the source bus extension 19b underlying them form the coupling element 42.

FIG. 10A is an enlarged plan view of a second region 200 in FIG. 8, showing a first example of its structure. FIG. 10B is a sectional view taken on the line 10B—10B in FIG. 10A. On the base plate 11 there are provided gate bus extensions 18b each having the gate terminal 20a connected to the external short circuiting bus 31. The gate bus extensions 18b are formed of the same material as that of the source buses 19, their extensions 19b and the external short circuiting bus 31 and simultaneously with their formation. At the same time as the semiconductor layer 21 of the TFT's is formed the semiconductor layer 44 is deposited which strides across each gate bus extension 18b widthwise thereof as is the case with the coupling element 42 shown in FIGS. 9A, 9B and 9C. Also in this case, the aforementioned gate insulating film 22 deposited all over the base plate 11 is selectively etched away to form a hole 46 for exposing therethrough the gate terminal 20a, a hole 47 for connection to the gate bus extension 18b and a hole 45 for connection to the semiconductor layer 44. The gate bus 18 deposited on the gate insulating film 22 is connected at one end to the gate bus extension 18b through the hole 47. At the same time as the formation of the gate buses 18 the internal short circuiting bus 32 is formed across the respective holes 45 so that it is connected therethrough to the semiconductor layer 44.

Figure 11A:
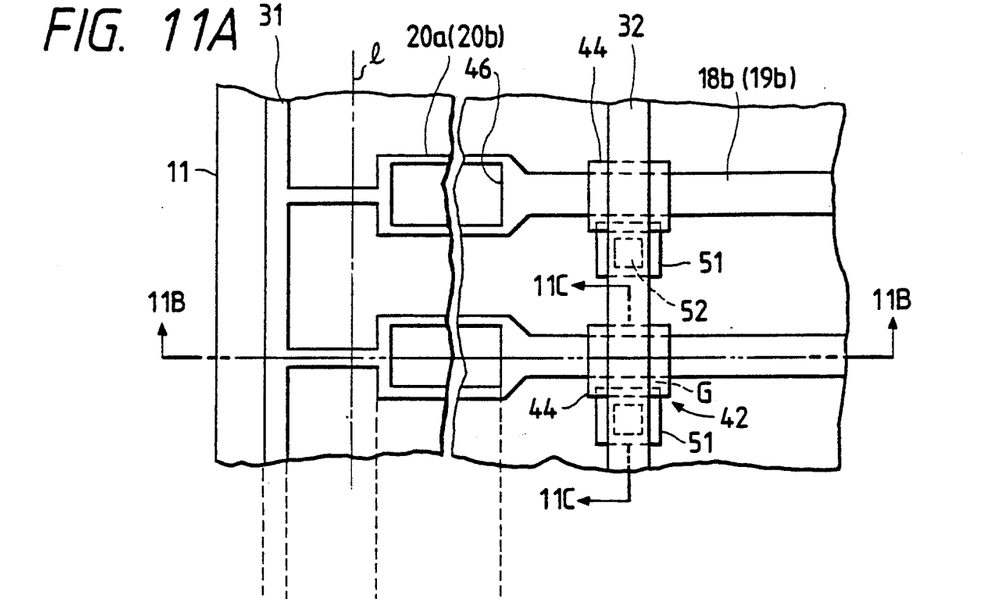
FIG. 11A is an enlarged plan view showing a second example of the structure of the first region 100.
Figure 11B:
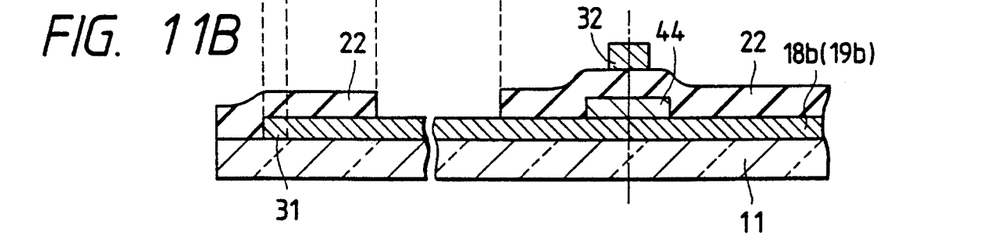
FIG. 11B is a sectional view taken on the line 11B—11B in FIG. 11A.
Figure 11C:
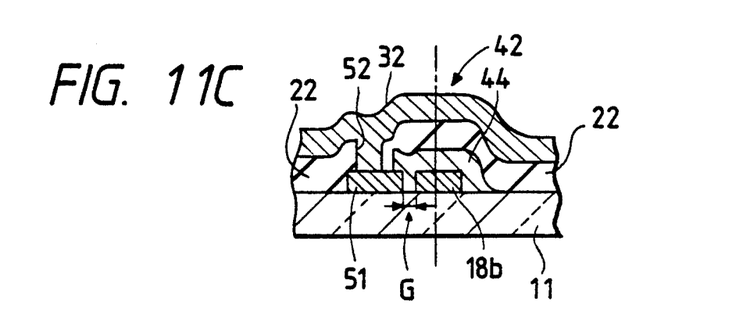
FIG. 11C is a sectional view taken on the line 11C—11C in FIG. 11A.

FIGS. 11A and 11B illustrate a second example of the structure of each of the first and second regions 100 and 200. As will be seen from the above, the structure on the gate bus extension 18b in FIG. 10B is the same as the structure on the source bus extension 19b in FIG. 9B, and this is true of the second example shown in FIGS. 11A and 11B. Hence, only the structure on the gate bus extension 18b will be described with reference to FIGS. 11A and 11B and the corresponding parts in the structure on the source bus extension 19b will be indicated by parenthesized their reference numerals.

On the transparent base plate 11 square-shaped conductor lands 51 and the gate bus extensions 18b (and the source bus extensions 19b) are simultaneously formed of the same material with very small gaps G defined therebetween. Then the semiconductor layers 44 are deposited filling in the gaps G between the bus extensions 18b (19b) and the conductor lands 51 and extending across the bus extensions 18b (19b) widthwise thereof. The gate insulating film 22 is deposited all over the transparent base plate 11 on which the semiconductor layers 44, the conductor lands 51, the bus extensions 18b (19b), etc. are formed. Those portions of the gate insulating film 22 overlying the conductor lands 51 and the terminals 20a and 20b are etched away to form holes 52 and 46, respectively. The internal short circuiting bus 32 deposited on the gate insulating film 22 is connected to the conductor lands 51 through the holes 52. The semiconductor layer 44 and the end portion of the bus extension 18b (19b) and the conductor land 51 connected in series to each other constitute each coupling element 42.

Figure 12A:
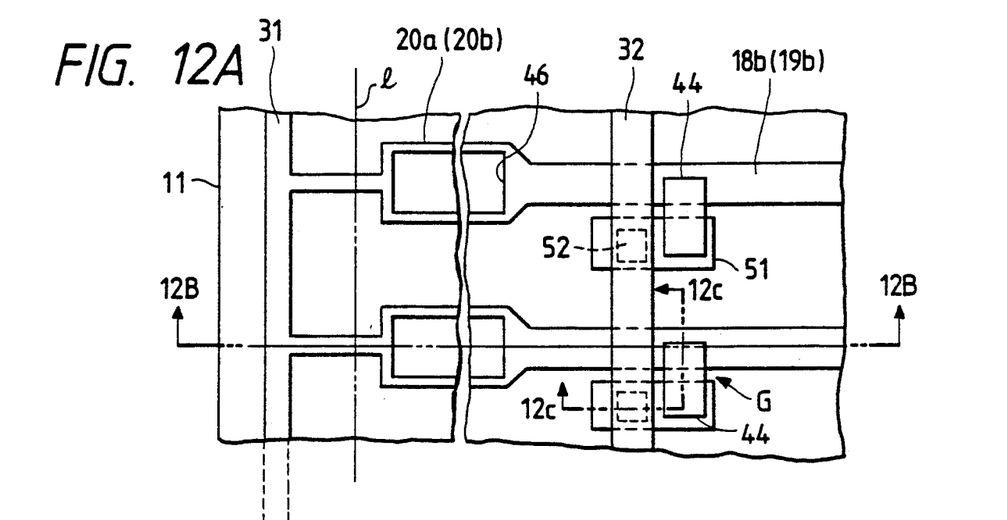
FIG. 12A is an enlarged plan view showing a third example of the structure of the first region 100.
Figure 12B:
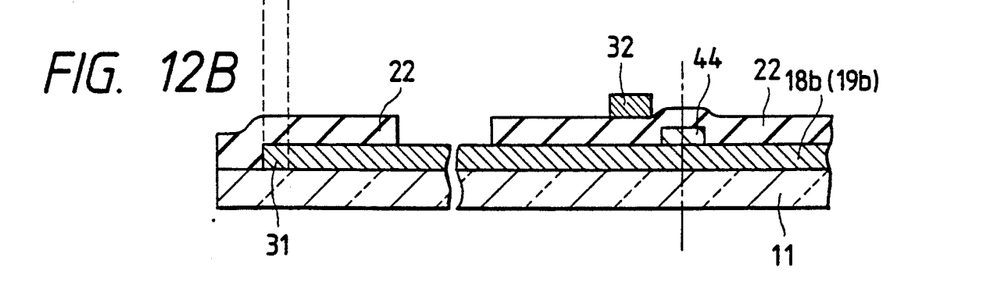
FIG. 12B is a sectional view taken on the line 12B—12B in FIG. 12A.
Figure 12C:
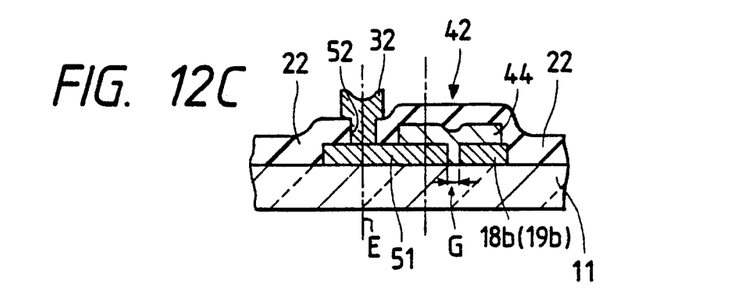
FIG. 12C is a sectional view taken on the line 12C—12C in FIG. 12A.

FIGS. 12A, 12B and 12C illustrate a third example of the structure of the present invention. Also in this example the structure on the gate bus extension 18b and the structure on the source bus extension 19b are identical with each other; hence, a description will be given solely of the former. The conductor land 51 is formed in a rectangular form along one side marginal edge of the gate bus extension 18b with the very small gap G defined therebetween, and the semiconductor layer 44 is formed to bridge between the conductor land 51 and the bus extension 18b (19b) across the gap G therebetween. Then the gate insulating film 22 is deposited all over the base plate 11 and is selectively etched away to form the holes 46 for exposing the bus terminals 20a (20b) and the holes 52 for connection to the conductor lands 51. The internal short circuiting bus 32 is formed so that it does not overlap the semiconductor layers 44 but extends across the holes 52 and the bus extensions 18b (19b). In this way, the internal short circuiting bus 32 is connected to the bus extensions 18b (19b) through the conductor lands 51 and the semiconductor layers 44, and at their connecting portions, the coupling elements 42 are constructed, respectively.

In the first example (shown in FIGS. 9A, 9B, 9C, 10A and 10B), since the surface layer of each semiconductor layer 44 is also partly removed when the gate insulating film 22 is selectively etched away to form the hole 45 therein there is a risk that the electrical characteristic of the coupling element 42 will somewhat deviates from its specified value. The second and third examples (shown in Figs. 11A, 11B and 12A, 12B) are free from such a defect.

In the embodiment depicted in FIG. 8, it is desirable to employ a structure in which the bus extensions 18b and 19b having terminals 20a and 20b are provided at both ends of the gate and source buses 18 and 19 and connected to the external short circuiting bus 31, and the external short circuiting bus 31 forms into a closed loop. It is also possible, of course, to provide the bus terminals 20a and 20b only at one end of the gate or source buses 18 or 19. The loop of the external short circuiting bus 31 may also be partly opened.

It is desirable that the internal short circuiting bus 32 also be a closed loop and be connected to the bus extensions 18b and 19b via the coupling elements 42 at both ends of the gate and source buses 18 and 19. Also in this instance, the internal short circuiting bus 32 may be connected via the coupling elements 42 to the buses only at one end thereof. The internal short circuiting bus 32 may also be open.

The internal and external short circuiting buses 32 and 31 can be formed using semiconductor materials as well as conductors such as metal and ITO.

According to the present invention, since the structure includes internal short circuiting bus 32 and the coupling elements 42 for electrically connecting thereto all the gate and source buses at all times, static electricity which is generated not only in the display device manufacturing process but also in the assembling of apparatuses using the display device and on all other occasions can be dispersed over the entire array of the buses; hence, it is possible to prevent the afore-mentioned line defect owing to static electricity.

By combining the above-noted means with the external short circuiting bus 31 provided on the extended marginal portion of the base plate 11 outside of the bus terminals 20a and 20b, the measures against static electricity during the display device manufacturing process can be made more effective. In addition, since the internal short circuiting bus 32 and the coupling elements 42 dissipate the energy of static electricity which develops during cutting the above-said extended marginal portion of the base plate, there is no fear of generation of such a defect as encountered in the past.

It will be apparent that many modifications and variations may be effected without departing from the scope of the novel concepts of the present invention.

What is claimed is:

1. In an active matrix liquid crystal display device which has, on a transparent base plate, a plurality of equally-spaced-apart source and gate buses formed at right angles to each other, thin film transistors each connected to said source and gate buses at their intersecting point and formed at a corner in a pixel region defined by said intersecting source and gate buses, pixel electrodes each connected to one of said thin film transistors and formed over a wide area in said pixel region, and source and gate bus terminals connected to said source and gate buses at one end thereof, respectively, and formed along marginal edges of said transparent base plate, the improvement comprising:

an internal short circuiting bus formed on said transparent base pate across said source and gate buses outside of a display region containing said thin film transistors and said pixel electrodes both arranged in a matrix form but inside of arrays of said source bus terminals and said gate bus terminals;

an external short circuiting bus formed on said transparent base plate outside of and along said arrays of said source and gate bus terminals, said source and gate bus terminals being connected to said external short circuiting bus; and coupling elements each formed of a high resistance material on said transparent base plate in the vicinity of each said intersecting point of said source and gate buses, for electrically interconnecting said source and gate buses;

each of said coupling elements including a semiconductor layer region formed simultaneously with a semiconductor layer of each of said thin film transistors, said semiconductor layer region being formed across each of said source and gate buses widthwise thereof, a gate insulating film formed on said semiconductor layer region common to all of said thin film transistors, and a hole formed in said gate insulating film overlying said semiconductor layer region, said internal short circuiting bus being connected to said semiconductor layer region through said hole and extending on said gate insulating film.

2. In an active matrix liquid crystal display device which has, on a transparent base plate, a plurality of equally-spaced-apart source and gate buses formed at right angles to each other, thin film transistors each connected to said source and gate buses at their intersecting point and formed at a corner in a pixel region defined by said intersecting source and gate buses, pixel electrodes each connected to one of said thin film transistors and formed over a wide area in said pixel region, and source and gate bus terminals connected to said source and gate buses at one end thereof, respectively, and formed along marginal edges of said transparent base plate, the improvement comprising:

an internal short circuiting bus formed on said transparent base plate across said source and gate buses outside of a display region containing said thin film transistors and said pixel electrodes both arranged in a matrix form but inside of arrays of said source bus terminals and said gate bus terminals;

an external short circuiting bus formed on said transparent bas plate outside of and along said arrays of said source and gate bus terminals, said source and gate bus terminals being connected to said external short circuiting bus; and coupling elements each formed of a high resistance material on said transparent base plate in the vicinity of each said intersecting point of said source and gate buses, for electrically interconnecting said source and gate buses;

each of said coupling elements including a semiconductor layer region formed simultaneously with a semiconductor layer of each of said thin film transistors, each said coupling element also including a conductive land formed in adjacent but spaced relation to a corresponding one of said source and gate buses, said semiconductor layer region extending from said conductor land to said corresponding source or gate bus, said gate insulating film extending from said thin film transistors to and overlying said semiconductor layer region, and a hole formed in said gate insulating film overlying said conductor land, said internal short circuiting bus being connected to said conductor land through said hole and extending on said gate insulating film.

3. The display element of claim 2, wherein said semiconductor layer region is formed adjacent a marginal edge of said internal short circuiting bus.

4. In an active matrix liquid crystal display device which has on a transparent base plate, a plurality of equally-spaced-apart source and gate buses formed at right angles to each other, thin film transistors each connected to said source and gate buses at their intersecting point and formed at a corner in a pixel region defined by said intersecting source and gate buses, pixel electrodes each connected to one of said thin film transistors and formed over a wide area in said pixel region, and source and gate bus terminals connected to said source and gate buses at one end thereof, respectively, and formed along marginal edges of said transparent base plate, the improvement comprising:

an internal short circuiting bus formed on said transparent base plate across said source and gate buses outside of a display region containing said tin film transistors and said pixel electrodes both arranged in a matrix form but inside of arrays of said source bus terminals and said gate bus terminals;

an external short circuiting bus formed on said transparent base plate outside of and along said arrays of said source and gate bus terminals, said source and gate bus terminals being connected to said external short circuiting bus; and coupling elements each formed of a high resistance material on said transparent base plate in the vicinity of each said intersecting point of said source and gate buses, for electrically interconnecting said source and gate buses;

each of said coupling elements including a semiconductor layer region formed simultaneously with a semiconductor layer of each of said thin film transistors, said gate buses being formed on said gate insulating film deposited all over said transparent base plate, each of said gate buses having at least at one end thereof a gate bus extension formed under said gate insulating film to extend therefrom and connected at one end thereof to the one end of said gate bus through a hole made in said gate insulating film, said gate bus terminal each being connected to the other end of said gate bus extension, and each si coupling element being formed on an intermediate portion of said gate bus extension.

5. The display element of claim 4, wherein said coupling element connected to said gate bus corresponding thereto has said semiconductor layer region formed under said gate insulating film and extending over said gate bus extension widthwise thereof, and said semiconductor layer region overlying said gate bus extension is connected to said internal short circuiting bus on said gate insulating film through a hole made therein.

6. The display element of claim 4, wherein said coupling element connected to said gate bus corresponding thereto includes a conductor land formed adjacent a corresponding one of said gate bus extensions under said gate insulating film and said semiconductor layer region extending from said conductor land to said corresponding gate bus extension, and said conductor land is connected to said internal short circuiting bus on said gate insulating film through a hole made therein.

7. The display device of one of claims 1, 2 or 4 wherein said coupling elements are connected to both ends of said gate buses and both ends of said source buses, and said internal short circuiting bus is formed around said display region containing said thin film transistors and said pixel electrodes and connected to all of said coupling elements.

* * * * *